W. A. BOCK.
SIDE BEARING.
APPLICATION FILED APR. 11, 1918.
1,283,057. Patented Oct. 29, 1918.
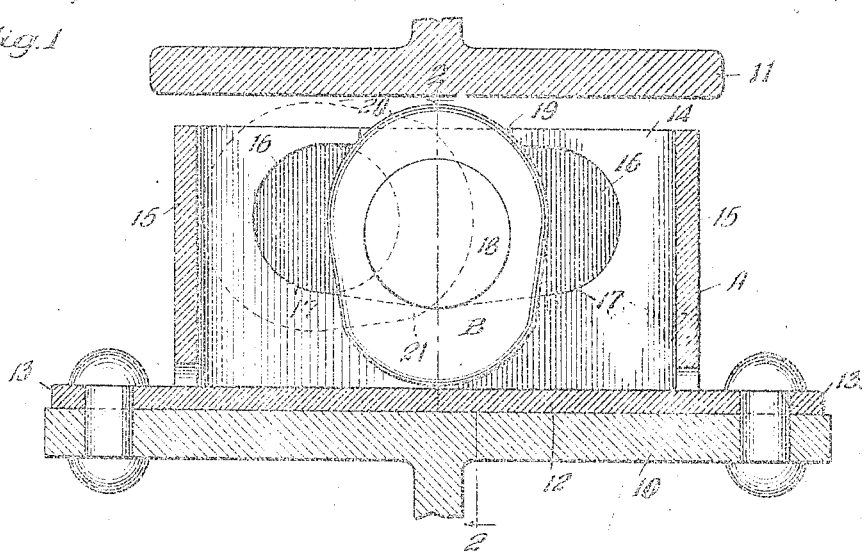
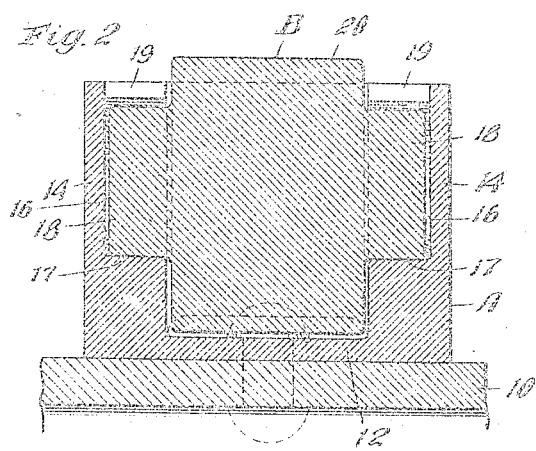
WITNESSES:
Wm. Geiger
INVENTOR.
William A. Bock
By George I. Haight
ATTORNEY

UNITED STATES PATENT OFFICE.

WILLIAM A. BOCK, OF CHICAGO, ILLINOIS, ASSIGNOR TO WILLIAM H. MINER, OF CHAZY, NEW YORK.

SIDE BEARING.

1,283,057.  Specification of Letters Patent.  Patented Oct. 29, 1918.

Application filed April 11, 1918. Serial No. 227,880.

*To all whom it may concern:*

Be it known that I, WILLIAM A. BOCK, a citizen of the United States, residing at Chicago, in the county of Cook and State of Illinois, have invented a certain new and useful Improvement in Side Bearings, of which the following is a full, clear, concise, and exact description, reference being had to the accompanying drawings, forming a part of this specification.

This invention relates to improvements in side bearings.

One object of the invention is to provide a simple and efficient side bearing including a bodily rolling anti-friction element, which side bearing consists of a minimum number of parts and so designed that the anti-friction element automatically returns to normal after each actuation under the influence of gravity.

Another and more specific object of the invention is to provide an anti-friction side bearing of the type above indicated wherein the anti-friction element is bodily elevated during its actuation so that the gravity effect on the element in returning it to normal is increased, the arrangement being such that the effective height of the engaging surface of said element is maintained constant, the bodily elevation of said element as an entirety being compensated for by a corresponding decrease in the radius of the bearing surface of said element to preserve said uniform height.

In the drawing forming part of this specification, Figure 1 is a vertical, sectional view of portions of body and truck bolsters of a car showing my improvements in connection therewith. The full lines of the anti-friction element indicate its normal position and the dotted lines the position assumed at the end of its movement in one direction. Fig. 2 is a vertical, sectional view, taken substantially on the line 2—2 of Fig. 1.

In said drawing, 10 denotes the upper portion of a truck bolster of a railway car and 11 the under side of an opposed body bolster, the same being pivoted in the usual manner as well understood in this art. The improved side bearing, as shown, consists merely of two elements, a box-like base or retaining casting A and the anti-friction element B.

The base casting A is of substantially hollow rectangular box-like form having a lower wall 12 secured by ears 13 to the body bolster; upstanding side walls 14—14; and end walls 15—15.

Each of the side walls 14 is recessed, as indicated at 16, so as to form oppositely and upwardly inclined runways or bearings 17—17, as clearly shown in Fig. 1.

The anti-friction element B is preferably made solid and has oppositely extended trunnions 18—18 operating within said recesses 16 and rolling upon said inclined bearing seats 17. The upper portions of the side walls of the base casting A are suitably cut away, as indicated at 19, in order to permit insertion of said trunnions into the recesses 16. The trunnions 18 are eccentrically disposed with respect to the bearing surface 20 of the element B, as will be apparent from inspection of Fig. 1. Said bearing surface 20 is so designed that the radius from the center or axis of the trunnions 18 to the uppermost point of said surface 20 when the element is in the position shown in full lines in Fig. 1, is a maximum. The distance from said surface 20 to the center of the trunnions gradually decreases on each side of the said high point and the decrease in radius is so made that, as the element B is bodily elevated while rolling up the inclined runways 17, the gradually changing high point or point of contact of said surface 20 with the bolster 11 will always remain at the same level. The under side of the element B, as viewed in its normal position, is formed as a counterbalance weight, as indicated at 21, so that the element B will be returned to central normal position after the release of the pressure at each actuation by two actions which are cumulative. One of these actions is the natural tendency of the element as an entirety to return to normal by rolling down the inclined runways 17. The other is the effect produced by the counterbalance section 21 which will automatically rotate the element so as to bring the heavy part thereof down to lowermost position, as indicated by the full lines in Fig. 1.

With the arrangement which I have shown and described, it is evident that I obtain a side bearing comprised of a minimum number of parts, all parts of which can be cheaply manufactured in the form of castings and which provides an unusually effective arrangement for returning the anti-friction element to normal position entirely under the influence of gravity. The design is such that its manufacture can be accomplished at comparatively small expense and the parts cannot ordinarily get out of order.

Although I have herein shown and described what I now consider the preferred manner of carrying out the invention, the same is merely illustrative, as it is evident that the essential inventive ideas may be embodied in other designs than that shown and I contemplate all changes and modifications that come within the scope of the claims appended hereto.

I claim:

1. In a device of the character described, the combination with a retaining member, of a rolling anti-friction element cooperable with said retaining member, means for elevating said element as an entirety when it is rolled to either side of its central normal position so that said element will return to normal under the influence of gravity, the bearing surface of said element being formed to compensate for the elevation of the element during its rolling movement to thereby maintain the effective bearing height at a constant level.

2. In a device of the character described, the combination with a retaining member, of an anti-friction element adapted for rolling movement and weighted at its under side when in normal position, said weighted section of the element assisting in the return movement of the anti-friction element to normal after each actuation thereof.

3. In a device of the character described, the combination with a base member having oppositely arranged bearing surfaces extending upwardly from each of the centers thereof, of an anti-friction element having cooperative engagement with said surfaces and adapted to be elevated as an entirety when it is moved to either side of normal, the active bearing surface of said element being so formed that the vertical height of the high point of said bearing surface of the element in any position of the latter remains constant.

4. In a device of the character described, the combination with a base casting having side walls, the latter being provided with oppositely and upwardly extended bearing seats, of an anti-friction element interposed between said side walls and having journals rolling upon said bearing seats, said anti-friction element being bodily supported by said journals on said bearing seats, so that said element is elevated as an entirety when it is rolled to either side of normal, pressure applied to said element being transmitted through said journals to said bearing seats.

5. In a device of the character described, in combination: a retaining member adapted to be secured to a bolster and a rolling anti-friction element having a bearing surface adapted to cooperate with an opposed bolster; and cooperating means on said member and element adapted to elevate the latter bodily when it rolls to either side of normal position and thereby permitting said element to return to normal by rolling under the influence of gravity, the bearing surface of said element being so designed that its effective bearing height remains at a constant level as it is rolled from normal.

6. In a device of the character described, in combination: a retaining member adapted to be secured to a bolster and a rolling anti-friction element having a bearing surface adapted to cooperate with an opposed bolster; cooperating means on said member and element arranged to elevate the latter bodily as it rolls to either side of normal position whereby said element is adapted to return to normal by rolling under the influence of gravity, the bearing surface of said element being so designed that its radius varies to compensate for the bodily elevation of said element and maintain a bearing surface at a constant level; and a counterbalancing weighted section on said element normally in a depending position, said section being elevated as the element rolls from normal position and also adapted to assist in returning the element to normal position after each actuation.

In witness that I claim the foregoing I have hereunto subscribed my name this 4th day of April, 1918.

WILLIAM A. BOCK.

Witnesses:
Wm. F. Winter,
Arthur F. Pallas.